Jan. 28, 1958 L. V. McCARTY 2,821,212
AUTOMATIC SHUT-OFF FUELING NOZZLE
Filed Oct. 3, 1955 2 Sheets-Sheet 1
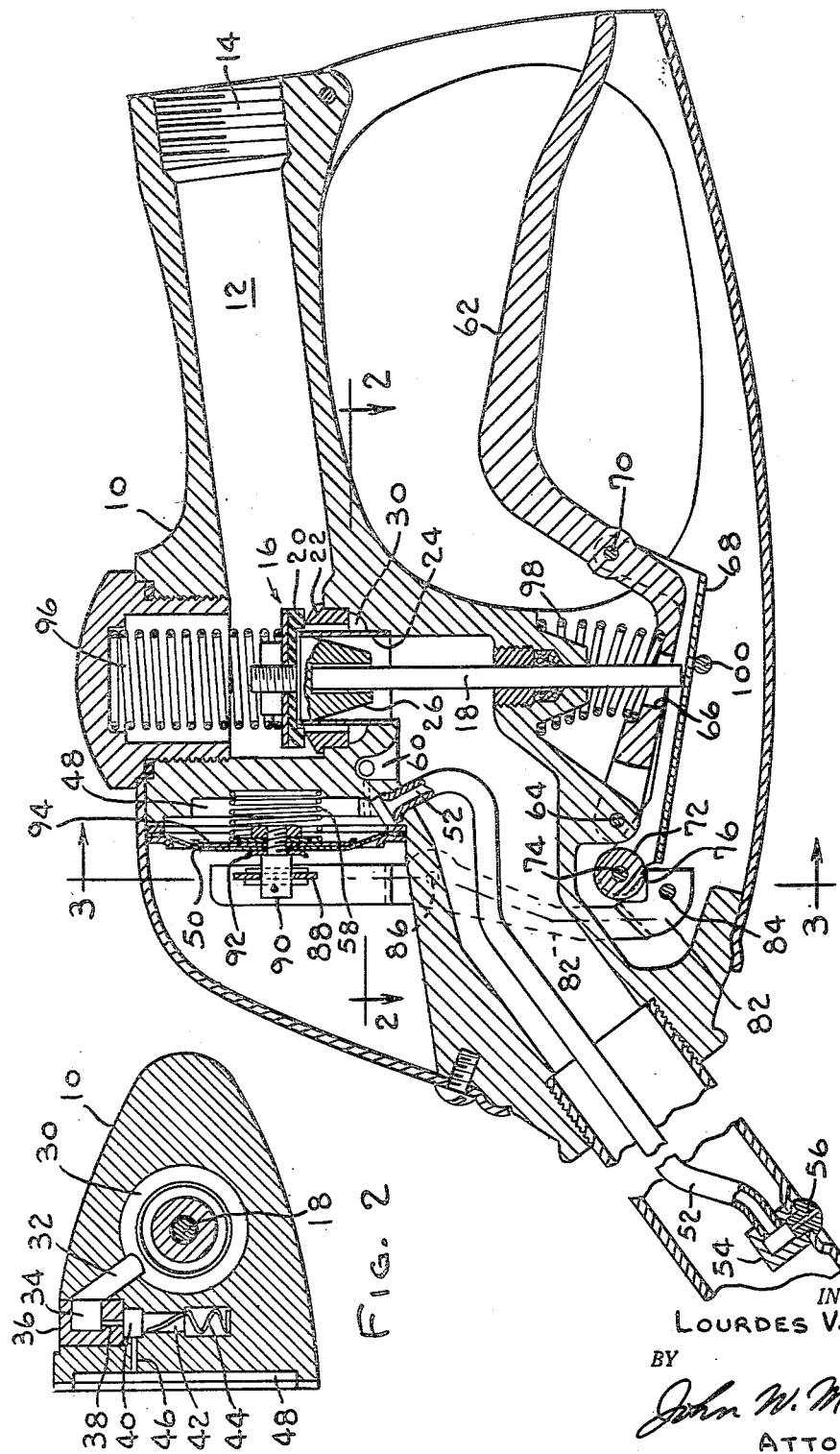
INVENTOR.
LOURDES V. McCARTY
BY
*John W. Michael*
ATTORNEY

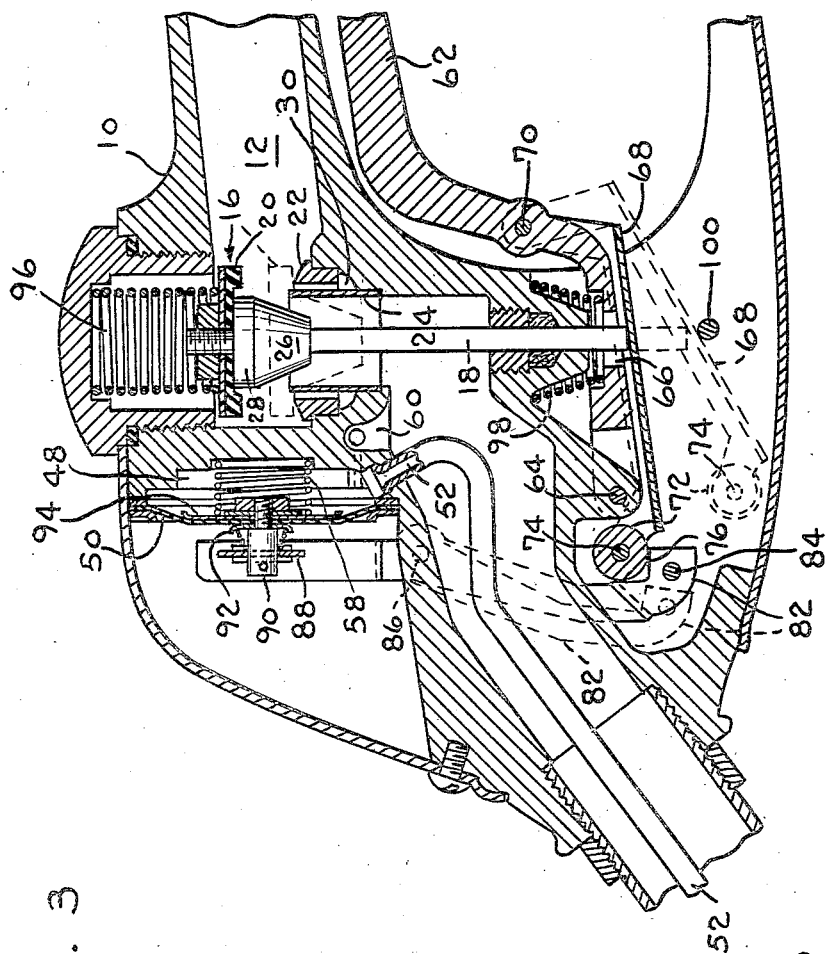
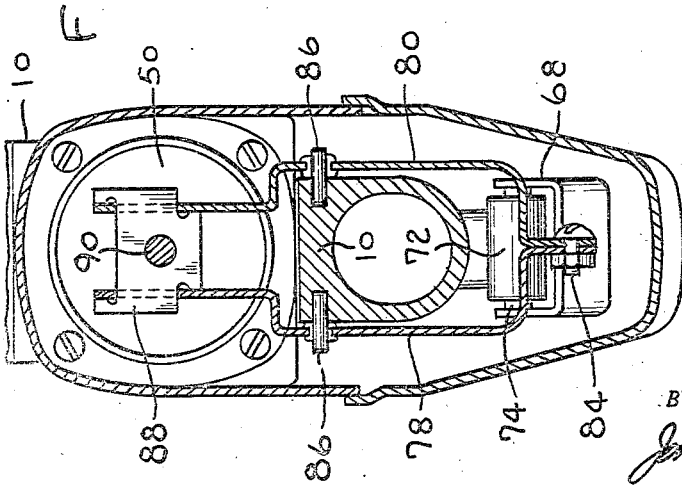
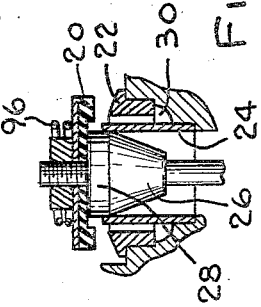

2,821,212

AUTOMATIC SHUT-OFF FUELING NOZZLE

Lourdes V. McCarty, Milwaukee, Wis., assignor to Controls Company of America, Schiller Park, Ill., a corporation of Delaware Application October 3, 1955, Serial No. 537,984

18 Claims. (Cl. 141—209)

This invention relates to a fuel nozzle which shuts off automatically when the fuel level reaches the end of the nozzle.

Fuel nozzles of this broad type are not new and in fact are widely used. The nozzle is provided with a manually operated valve lever which may be held in the valve open position manually or mechanically. With the lever so held an aspirator-operated latch mechanism releases the valve for closing when the fuel level reaches the tip of the nozzle. The prior art valves of this type are not entirely satisfactory for several reasons. A number of the valves fail to operate at extremes of pressure. Thus, if the pressure at the nozzle inlet is much below or above normal, the aspirator fails to operate. Other valves fail to function properly when delivering fuel at a low rate. Still others are practically impossible to operate at low flow rates.

The principal object of the present invention is to overcome the objectionable features of the prior art structures.

Another object is to provide an improved valve arrangement to secure improved control over low flow rates.

Still another object is to provide an improved venturi for operating the aspirator.

A further object is to provide a simple linkage providing for ready disconnection of the manually operated lever and the lever acting on the valve.

Other objects and advantages will be pointed out in, or be apparent from, the specification and claims, as will obvious modifications of the single embodiment shown in the drawings in which:

Fig. 1 is a vertical section through the nozzle showing the valve closed;

Fig. 2 is a section taken on line 2—2 in Fig. 1 to show the details of the venturi and the low flow path;

Fig. 3 is a section taken on line 3—3 on Fig. 1;

Fig. 4 is a view similar to Fig. 1 but shows the valve open in solid lines and in dotted lines shows the tripped position of the lever and the valve; and Fig. 5 is a detail of the valve in its low flow position.

Referring to the drawings in detail, the fuel nozzle has a body 10 provided with an inlet 12 threaded at 14 for connection to the hose leading from the fuel pump. Gasoline flowing through the inlet is regulated by valve assembly 16 which includes two valves serially arranged for actuation by stem 18. The first valve comprises a neoprene disc valve 20 mounted on stem 18 and cooperating with seat 22 pressed in the valve body. This valve regulates flow to the annular space between seat 20 and cylindrical sleeve 24. When the valve is raised only slightly, as in Fig. 5, the cylindrical portion 28 of valve 26, also mounted on stem 18, acts to prevent flow centrally of the sleeve 24. Of course, when the stem 18 is moved upwardly further, the conical portion of valve 26 comes into operation and permits a gradual increase in the rate of flow past valve 26.

Whenever valve 20 is raised from seat 22, there will be flow into annular space 30 between the sleeve 24 and seat 22. The gasoline flows from space 30 through conduit 32 into cross conduit 34 in plug 36 pressed into the body 10. The plug 36 is also provided with a small axial bore 38 through which the gasoline flows into the large bore chamber 40 and conduit 42. As the gasoline flows from the small bore 38 into the large areas 40 and 42, the gasoline tends to spray outwardly, and it is desired to have the liquid completely fill conduit 42 in order to insure a reduced pressure in the chamber 40 by venturi action. In order to insure this fanning out of the stream coming from the small bore 38 at all flow rates and at all pressures, the wire or spring 44 is bent as shown to provide an end projecting into conduit 42 to break up any solid stream coming from the small bore 38. This very effectively insures filling the bore 42 with liquid to prevent loss of the desired venturi effect. The reduced pressure in chamber 40 acts through the lateral bore 46 to communicate with aspirator chamber 48 on the right-hand side of diaphragm 50. The aspirator chamber 48 is vented through conduit 52 which runs down the center of the nozzle spout and terminates in fitting 54 mounted adjacent the end of the spout and including a vent 56. As soon as the liquid level in the container being filled rises to the level of vent 56, the breathing of the aspirator chamber 48 is blocked and the reduced pressure in chamber 40 becomes effective to act on diaphragm 50 to pull the diaphragm 50 to the right in opposition to the bias of spring 58.

The low rate liquid flow which is employed to obtain the venturi action at chamber 40 flows from conduit 42 into passage 60 which communicates with the interior of the spout on the downstream side of the valves. When the valve stem 18 is raised to open the conical valve 26, the flow through the venturi section and out passage 60 continues so the venturi effect is operative at all times.

The valves are operated by raising handle 62 about its pivot 64. It will be noted that stem 18 passes through aperture 66 in the handle to rest on lever 68, the right-hand end of which is pivotally connected to the handle at 70 and the left-hand end of which is provided with a roller 72 rotatably mounted on pin 74 and normally resting on support or ledge 76 formed by the lower ends of the two similar arms 78, 80 forming the rocker arm 82. Thus, the lower ends of arms 78, 80 are connected by the nut and bolt 84 and are pivotally connected to the body 10 by pins 86, 86. At the upper end of the lever 82 the arms 78, 80 are interconnected by a plate 88 which is connected to diaphragm pin 90. This pin is connected to the diaphragm 50 through the medium of the usual plates 92, 94.

As previously noted, spring 58 acts on diaphragm 50 to hold the diaphragm in the position shown in Fig. 1. Under this condition, rocker 82 is urged by the diaphragm spring 58 in a counter-clockwise direction about its pivot 86. This holds ledge 76 under roller 72 so that when handle 62 is raised lever 68 will also be raised to lift valve stem 18 and open valve 20 alone or in combination with the conical valve 26. Now then, handle 62 can be held open manually or could be propped in the open position while the gasoline fills the container into which it is being dispensed. When the gasoline level reaches aspirator vent 56 in the tip of the nozzle, the vent becomes plugged and the low pressure in venturi chamber 40 becomes effective to reduce the pressure on the right-hand side of diaphragm 50 whereupon atmospheric pressure acting on the left-hand side of the diaphragm will move the diaphragm to the right against the bias of spring 58. When this happens, rocker 82 is rotated in a clockwise direction about its pivot 86 and ledge 76 is withdrawn from its position under roller 72, leaving the left-hand end of lever 68 without support. When this occurs, spring 96, acting on the valves in the seating direction, will act to close the valves while lever 68 drops to the position shown in Fig. 4 in dotted lines. It will be noted that the valves close even though the handle is held in the full open position. It will be appreciated that the release of lever 68 is quite smooth and calls for very little effort since there is a rolling connection between lever 68 and rocker 82.

After the valves have been closed as shown in dotted lines in Fig. 4, the mechanism may be reset by releasing handle 62 for movement back to the position shown in Fig. 1 under the influence of spring 98 compressed between the nozzle body and handle 62. As the handle moves downwardly to the position shown in solid lines in Fig. 1, the left-hand end of the released lever 68 will be forced to move upwardly by contact of the lever with pin 100. Thus, as the right-hand end of lever 68 is lowered, the lever 68 must rock about pin 100. Since the valve has closed, there is no pressure acting on the diaphragm and rocker 82 has returned to its normal position. Therefore, the elevation of the left end of lever 68 permits the rocker to return to its normal position with ledge 76 under the roller. On the way up the roller cams the rocker out of its path.

The venturi arrangement provided in this valve provides a substantial pressure reduction for operating the aspirator at all flow rates and appears to be quite independent of the pressure at the inlet of the nozzle. The provision of spring or wire 44 accounts for this in large part since it prevents venting through passage 60. Without the wire, the flow at some conditions tends to remain a fine stream which is useless for the venturi action. The present nozzle will release the valves to close at all flow and pressure conditions which might be encountered in use. The present valve can be used with such accuracy that it will fill a small paper cup and still trip out in time to close the valves.

Coupled with the venturi arrangement deriving the working pressures for the aspirator is the novel lever arrangement which requires very little releasing force since all that is required is to move the ledge 76 from under roller 72. It will be apparent that actually the ledge need only move a very small distance before the corner of the ledge is effectively operating off center with respect to pivot 74, at which time the roller itself will act to drive the lever 82 away so the valves may close.

The arrangement for bypassing some of the flow to derive the venturi action has the added advantage of giving a very low rate of flow when desired. This, of course, relies on the serial arrangement of the two valves. Even though the two valves are provided, the construction is of extremely simple nature and of quite low cost with respect to other valves normally found in this field.

Although but one embodiment of the present invention has been illustrated and described, it will be apparent to those skilled in the art that various changes and modifications may be made therein without departing from the spirit of the invention or from the scope of the appended claims.

I claim:

1. In a fueling nozzle of the type having a body provided with an inlet and an outlet with a valve regulating flow therebetween and an aspirator including a diaphragm movable from its normal position to its operative position when the aspirator vent is closed, a stem connected to the valve for actuating the valve, a handle pivoted on the body for manual actuation, a rocker pivoted on the body with one end connected to the diaphragm and its other end movable when the diaphragm moves, a lever having one end pivotally connected to the handle and its other end releasably connected to said other end of said rocker, said lever being connected to the valve stem for actuation of the valve when the handle is actuated, said rocker and said lever being disconnected when the diaphragm moves to said operative position, and means biasing the valve closed.

2. A fueling nozzle according to claim 1 in which the lever and rocker are interconnected by a sliding connection including a roller acting between the rocker and lever to reduce the force required to slide the rocker relative to the lever.

3. A fuel nozzle according to claim 1 in which the handle is biased in the valve closing direction by a spring, and the stem acts directly on the lever independently of the position of the handle.

4. A fuel nozzle according to claim 1 including a spring biasing the handle to the valve closed position, and means operable upon return of the handle to the closed position following disconnection of the rocker and lever to connect the rocker and lever.

5. A fuel nozzle according to claim 4 in which said means comprises a fulcrum about which said lever rocks as said handle moves to said closed position whereby said other end of said lever is moved into connection with said rocker.

6. A fuel nozzle comprising, a body having an inlet and an outlet, valve means for regulating flow from the inlet to the outlet, venturi means in said body for developing a reduced pressure, a diaphragm mounted in the body and cooperating therewith to define a chamber exposed to the reduced pressure, manually operable means for opening the valve and including means connecting the manual means and the diaphragm and responsive to movement of the diaphragm from one position to another position for rendering the manual means ineffective to open the valve means, means biasing the diaphragm to said one position, a vent from the chamber to a position adjacent the outlet to prevent reduction of the chamber pressure until the vent is closed whereupon the chamber pressure is reduced and the diaphragm is moved to its said other position, said venturi means comprising a small bore located on the downstream of said valve and discharging into a larger bore where the stream coming from the small bore fills the larger bore whenever there is flow through the venturi means to thereby prevent venting the venturi means from the large bore.

7. A fuel nozzle according to claim 6 including means mounted in the larger bore for breaking up the stream from the small bore to insure filling the larger bore.

8. A fuel nozzle according to claim 6 including a main flow passage and an auxiliary passage, said venturi means being located in said auxiliary passage, said valve means regulating flow through both of said passages.

9. A fuel nozzle according to claim 8 in which said auxiliary passage is employed for low flow rates through the nozzle and said valve means is operative to open the auxiliary passage before opening the main passage.

10. A fuel nozzle comprising, a body having an inlet and an outlet having a main passage and an auxiliary passage therebetween, a valve for each passage and controlled by a common valve stem, manually operable means for controlling the valve stem movement, venturi means in said auxiliary passage to develop a reduced pressure at the throat of the venturi means, aspirator means adapted to be actuated by the reduced pressure and including a vent to cancel the effect of the reduced pressure, means connecting said aspirator means to the manual means and operative to render the manual means ineffective when the vent is closed.

11. A fuel nozzle according to claim 10 in which the stem is operable to open said valves sequentially with the valve controlling the auxiliary passage being opened first.

12. A fuel nozzle according to claim 11 in which the valve for the auxiliary passage comprises a disc valve carried by the stem while the main valve is located centrally of the disc valve, the entrance to the auxiliary passage comprising an annular port surrounding the main passage, a valve seat around said annular port, said disc valve being adapted to seat on said seat.

13. A fuel nozzle according to claim 12 in which the main passage centrally of the annular port includes a sleeve and the main valve has a straight wall portion adapted to cooperate with the sleeve to prevent flow through the main passage during opening movement of the disc valve, said main valve including a tapered portion below the straight portion to provide in cooperation with said sleeve a gradually increasing opening as the main valve is opened further past the position in which the straight valve portion and the sleeve act to prevent flow through the main passage.

14. In a fuel nozzle of the type having manually operable valve means which is automatically closed by mechanism operated by an aspirator vented adjacent the nozzle outlet, venturi means through which fuel flows whenever fuel is flowing through the nozzle, said venturi means comprising a small diameter bore discharging into a large diameter bore to obtain a pressure reduction at the point of change from the small bore to the large bore, a member positioned in said large bore to break up the stream from the small bore to insure filling the large bore with liquid and prevent venting the aspirator through the venturi means.

15. The combination according to claim 14 in which the nozzle is provided with a main passage and an auxiliary passage both controlled by the valve means and the venturi means is located in the auxiliary passage.

16. The combination according to claim 15 in which the valve means opens the passages sequentially with the auxiliary passage being opened first.

17. A fueling nozzle comprising, a body having an inlet and an outlet, a valve in the body for regulating flow from the inlet to the outlet, a valve stem connected to the valve, means biasing the valve closed, a manually operable handle pivotally connected to the body, a lever having one end connected to the handle and its other end normally resting on a support, said stem being operated by said lever when the handle is moved about its pivot, said support being a part of a rocker arm pivotally mounted on the body for operation by an aspirator assembly, said assembly including a venturi employing liquid flowing past the valve for developing a partial vacuum on one side of a diaphragm which is vented to atmosphere until the liquid level in the container being filled by the nozzle reaches and plugs the vent, plugging of said vent causing the diaphragm to move to actuate the rocker to withdraw the support from under said other end of said lever.

18. In a fueling nozzle of the type in which an aspirator deriving a working pressure from a venturi through which fuel flows when the valve is open is employed to release the valve for closure when the aspirator vent is closed, the combination of, means including a support connected to the aspirator for movement between a normal and a release position, a handle pivotally connected to the nozzle body for manual operation, a lever pivotally connected to the handle and having one end normally resting on the support, a stem connected to the lever and the valve.

References Cited in the file of this patent

UNITED STATES PATENTS

| | | |
|---|---|---|
| 2,320,033 | Davis | May 25, 1943 |
| 2,582,195 | Duerr | Jan. 8, 1952 |
| 2,675,952 | Shaffer et al. | Apr. 20, 1954 |
| 2,686,626 | Slattery | Aug. 17, 1954 |